Dec. 20, 1966 B. JUNGE ET AL 3,292,878

PNEUMATIC CARRIER ACCESSING SYSTEM

Filed Sept. 24, 1965 3 Sheets-Sheet 1

*INVENTORS*
BJARNE JUNGE
RUSSELL A. STAUFFER
By John L Jackson
ATTORNEY

Dec. 20, 1966 B. JUNGE ET AL 3,292,878

PNEUMATIC CARRIER ACCESSING SYSTEM

Filed Sept. 24, 1965 3 Sheets-Sheet 2

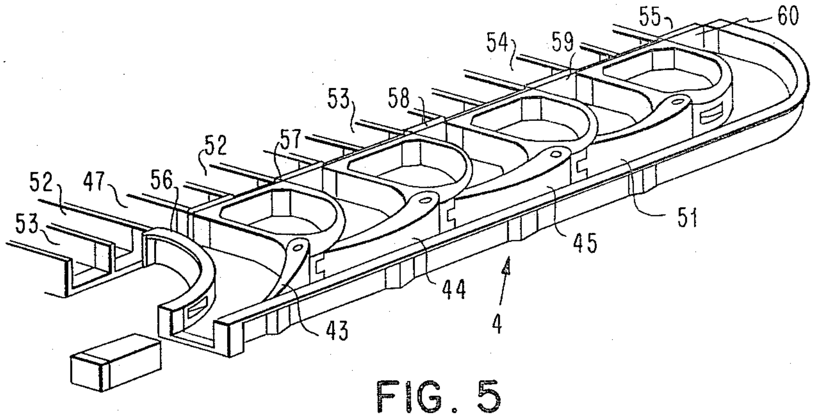
FIG. 5
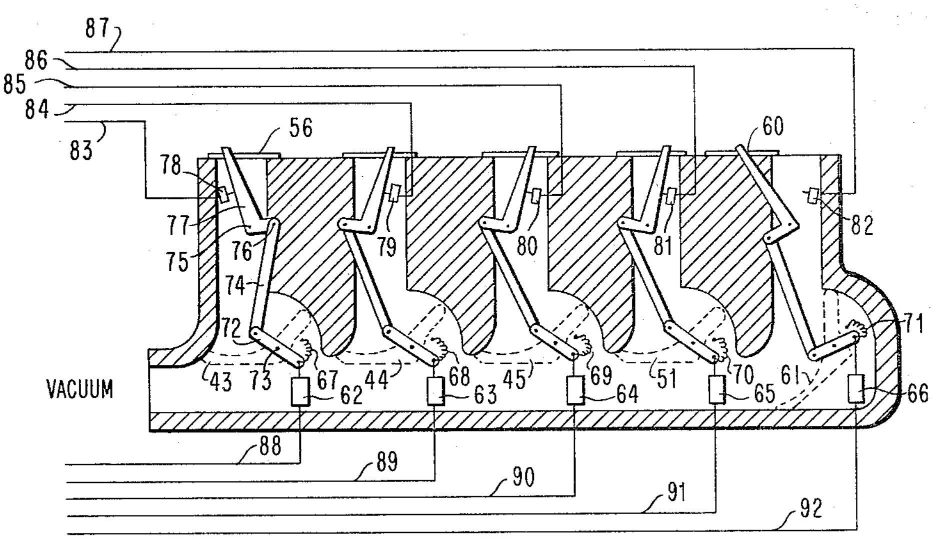
FIG. 6
| | NOT DETENTED | DETENTED IN | | |
|---|---|---|---|---|
| | | -1 | 0 | +1 |
| SW 102 | 0 | 0 | 1 | 1 |
| SW 103 | 0 | 1 | 1 | 0 |
FIG. 8
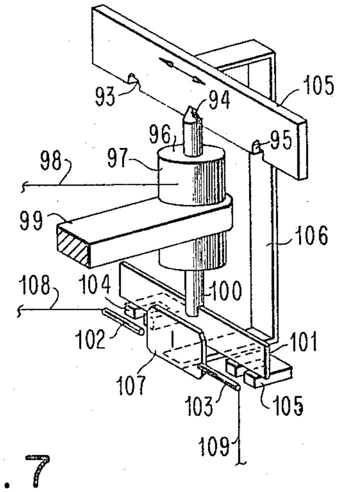
FIG. 7

United States Patent Office 3,292,878

Patented Dec. 20, 1966

3,292,878

PNEUMATIC CARRIER ACCESSING SYSTEM

Bjarne Junge, Los Gatos, and Russell Albert Stauffer, San Jose, Calif., assignors to International Business Machines Corporation, Armonk, N.Y., a corporation of New York Filed Sept. 24, 1965, Ser. No. 490,040
10 Claims. (Cl. 243—25)

This invention relates to pneumatic transport systems in general and more particularly to an accessing mechanism for selectively mechanically and pneumatically coupling one of a plurality of file access channels to a single file I/O tube for transport of selected carriers between an associated file and an I/O terminal.

In one prior art pneumatic storage and transport system, information is stored on film chips which in turn are stored in carriers or cells which are pneumatically transported between the file and an I/O terminal. The cells which are stored in the file are stored in drawers which are stacked to complete the file. When the drawers of the file are all in the home position, at least one column of through passages or delivery channels is provided through the file. When a cell is to be transported to or from the file, the drawer in which it resides is moved laterally so that the cell pocket in which it resides is in alignment with a through delivery channel of the file. Vacuum is then applied to the appropriate delivery channel to cause the cell to be extracted from the drawer or in the return mode, pressure is applied behind the cell to cause it to move back into its cell pocket. Thus, the cells of the file can be selectively withdrawn and replaced through positioning of the appropriate cell pockets in alignment with the delivery channels of the file. A more complete description of this type of system will be found in the patent application entitled, "Air Flow Control and Cell Deflector Blade System With Direct Access Matrix," Serial No. 423,015 by W. L. Grabowski, B. Junge and E. H. Storm, assigned to the assignee of the subject invention.

While this type of file provides high storage capabilities with ready access in a minimum amount of space by virtue of the drawer-delivery channel concept, problems are encountered in selecting the desired one of the delivery channels and setting up a pneumatic and mechanical path between the selected delivery channels and the file I/O tube. In the heretofore mentioned system of the patent application, one accessing column is provided for each of the delivery channels. As is obvious upon careful consideration of this type of selection system, the control requirements in a large system readily become quite complex. Thus, assuming that there are 45 delivery channels, as was the case in one prototype system, there must be provided 45 different control points which must not only be controlled but additionally must be sensed to determine whether or not the desired control in fact was accomplished. Moreover, the 45 accessing columns must then be routed into a switching system which must be controlled and monitored to set up a single pneumatic and mechanical path between a selected accessing column and the file I/O tube. Needless to say, the control problems are quite complex. Additionally, where one column is provided per delivery channel, the accessing mechanism itself becomes quite complex and, as a practical matter, it is impossible to provide in a large file one accessing mechanism per delivery channel. In the previously described system of the patent application, this was accomplished by allowing sufficient space between the delivery channels such that one accessing column and its attendant actuators could be accommodated over each of them. However, as is obvious, potential storage space is wasted and the ideal system would provide delivery channels closely spaced in a honeycomb type of arrangement. Thus, the walls forming the cell pockets should only be thick enough to satisfy the requirements of structural rigidity.

It is therefore an object of the present invention to provide a novel accessing system for use with a file having at least one column of delivery channels.

Another object of the present invention is to provide a novel accessing mechanism for use with a file having a plurality of columns of delivery channels wherein the delivery channels are closely spaced to provide the ultimate in storage capability.

Another object of the present invention is to provide a new accessing mechanism for use with a file system wherein a plurality of columns of delivery channels are to be selectively pneumatically accessed which may be controlled with a simple controller.

Another object of the present invention is to provide a new accessing mechanism wherein one of a plurality of delivery channels may be selectively mechanically and pneumatically coupled to a single file I/O tube with a maximum movement of any of the members of the accessing mechanism of a distance equal to the spacing of three delivery channels.

Another object of the present invention is to provide a novel accessing mechanism for selectively pneumatically and mechanically coupling any one of a plurality of delivery channels to a single file I/O channel by positioning a selection elbow over the selected channel and providing a through path from the selected elbow to the file I/O tube through the portions of the accessing mechanism nearer to the file I/O tube than the selected delivery channel.

Another object of the present invention is to provide an accessing mechanism for selectively accessing any one of a plurality of file delivery channels which is readily adaptable to automatic control.

Other and further objects and advantages of the invention will be apparent from the following more particular description of the preferred embodiment of the invention as illustrated in the accompanying drawings in which:

FIG. 5 is an isometric view of the row select illustrating its operation to mechanically and pneumatically connect a select passage of the column select section nearest to it to the file I/O tube;

FIG. 6 is a bottom view of the row select of FIG. 5 illustrating its mechanical operation, actuators and sensors to facilitate control;

FIG. 7 is a view of the detent and sensing mechanism which is connected to each of the three sections of the column select as well as the row select to provide both detenting at one of the three positions, —1, 0 and +1, as well as sense information as to whether or not the detenting was accomplished and if so, which position the members are detented at; and FIG. 8 is a truth table of the sensors of the detent mechanism of FIG. 7.

Briefly, the pneumatic accessing system includes four main units: three identical units, the column select sections and a row selector. Each column select section is made up of 5 column select segments each including a 90° elbow with a straight or through tube on each side. These 5 segments are ganged for movement. The row selector includes a prime outlet at one end thereof connected to the file I/O tube and 5 outlets, each controlled by a deflector valve, which depending on the position of their associated deflector valves may be connected to the prime outlet. The deflector valves are individually controlled. Each of the four units has three fixed locations, a center position or 0 position and a +1 position and a —1 position. When all of the units are at the 0 position, all of the elbows are in line and the five deflector controlled outlets in the row selector are lined up with the 5 elbows in the adjacent column select section. The spacing between the straight tubes and elbows is such that at whatever positions the different units are, the straight tubes and/or elbows of the three column select segments and the outlets in the row select are in alignment. The straight tubes in the column select sections connect the row select and selected elbows of the column selector sections spaced from the row selector. Each elbow covers three adjacent rows. Thus, complete coverage of three columns of 15 delivery channels may be obtained through selective movement of the four members between the 0, +1 or —1 positions along with selective manipulation of the five deflector valves in the row select mechanism.

Figure 1:
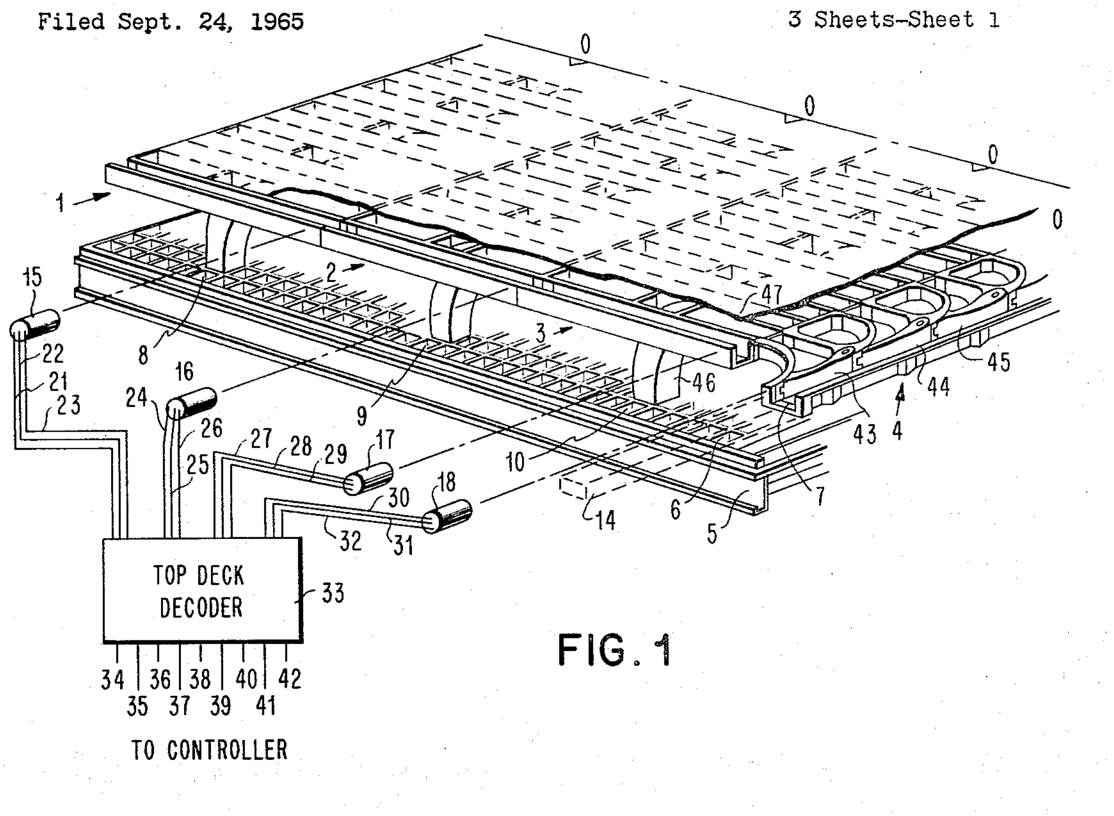
FIG. 1 is an isometric view of the pneumatic carrier accessing system with all three column select sections and the row select at the home position or 0 position.

For a more detailed description, refer first to FIG. 1 wherein is shown an overall isometric view of the top deck including column select sections 1, 2 and 3 and row select means generally designated at 4. Also shown is one drawer of a multi cell or carrier drawer 5. As previously discussed, the drawer 5 includes a number of cell pockets 6 in which may be stored carriers which are to be transported from the drawer through the column selector sections and row select means to the file I/O tube 14 from the row selector opening 7. Again as previously discussed, three columns of delivery channels 8, 9 and 10 are provided in the drawer 5 through which carriers from drawers (not shown) beneath the drawer 5 are conveyed up through drawer 5. Likewise, while drawer 5 is shown in the home position such that its delivery channels are in alignment with the elbows of the column select sections 1, 2 and 3, it is selectively movable to five positions on either side of the home position such that any of its cell pockets 6 may be brought into alignment with an elbow of a column select means if the elbows in turn are selectively positioned to their 1, 0 and —1 positions. This will be more fully described later. The movement of the drawer and the means for sensing this movement is no part of the present invention. For purposes of description of the invention, it will be enough to assume that cells may be delivered from any one of the cell pockets 6 of the drawer 5 or may be delivered from lower drawers through the columns of delivery channels 8, 9 and 10.

Application of vacuum to a selected elbow of one of the column select sections through the row select means 4 will cause the cell in alignment with it to be drawn up through the column select section and thence through the row selector to the file I/O tube through the row selector outlet 7.

Each of the column select sections 8, 9 and 10 are made up of 5 ganged column select segments. Each of the column select segments includes a 90° elbow, with through channels on each side of it. The interior dimensions of the elbows and through tube sections are such that they will pass a cell from the drawer 5 or the drawers under it which are delivered through the through channels of the drawer. The interior dimensions, however, should be snug enough relative to the cell to provide good pneumatical efficiency and yet loose enough to allow ready passage of a cell.

Still referring to FIG. 1, the row select means 4 is attached to the file I/O tube 14 for delivery of cells thereto and receipt of cells therefrom. The pneumatic supply to the column selector sections and row selector is through the file I/O tube 14. For purposes of the present invention, it is sufficient to state that vacuum or pressure may be selectively applied to the file I/O tube 14. As shown in FIG. 1, the three column select sections 1, 2 and 3 are at the 0 or home position wherein their respective elbows are positioned over the center delivery channel of the three delivery channels which each services. Since the column select sections are movable to any of three positions and since each includes 5 elbows, in the arrangement described, 15 delivery channels may be accessed by each column select section. Thus, each column includes 15 delivery channels or 15 cell pockets. Four actuators 15, 16, 17 and 18 are mechanically coupled to the column select sections 1, 2 and 3 and the row select means 4, respectively. These actuators are arranged such that by selective operation thereof, each of the column select sections and the row selector may be positioned to any of their three operative positions; i.e., home, +1 or —1. As shown, actuator 15 is driven by drive lines 21–23, actuator 16 is driven by drive lines 24–26; actuator 17 is driven by drive lines 27–29 and the row select actuator 18 is driven by drive lines 30–32. Any conventional type of actuator may be used. Selective energization of one of the drive lines of an actuator will cause it to move its associated column select section or row select means to either the 0, +1 or —1 position. Also shown in FIG. 1 is a top deck decoder 33 which may be used to selectively energize any of the drive lines leading to the actuators 15–18. As will be obvious to one skilled in the art, a top deck decoder is not needed in that any of the drive lines may be energized by a conventional switch or relay. The top deck decoder 33 is, however, provided for use in an automated control system.

The top deck decoder may be of any conventional type which decodes the input control character appearing on input lines 34–42 and furnishes control signals to the actuators 15, 16, 17 or 18 by energization of one of the input windings thereof. It will be clear that the input along lines 34–42, in certain instances, will be such that only one of the actuators will be actuated while the others will remain at their effective home positions or in other instances, all of the actuators or any number thereof may be actuated to provide the required movement of the column select sections and row select means to effect selection of the desired carrier pocket whether it be from the drawer 5 or from one of the delivery columns 8, 9 or 10.

The drawing of FIG. 1 is cutaway so that the interior of the column select segments 1, 2 and 3 as well as the detail of the row select means 4 is shown. In the position that the column select sections and row selector are in FIG. 1, none of the carrier pockets are in mechanical and pneumatic communication with the file I/O tube 14.

Figure 2:
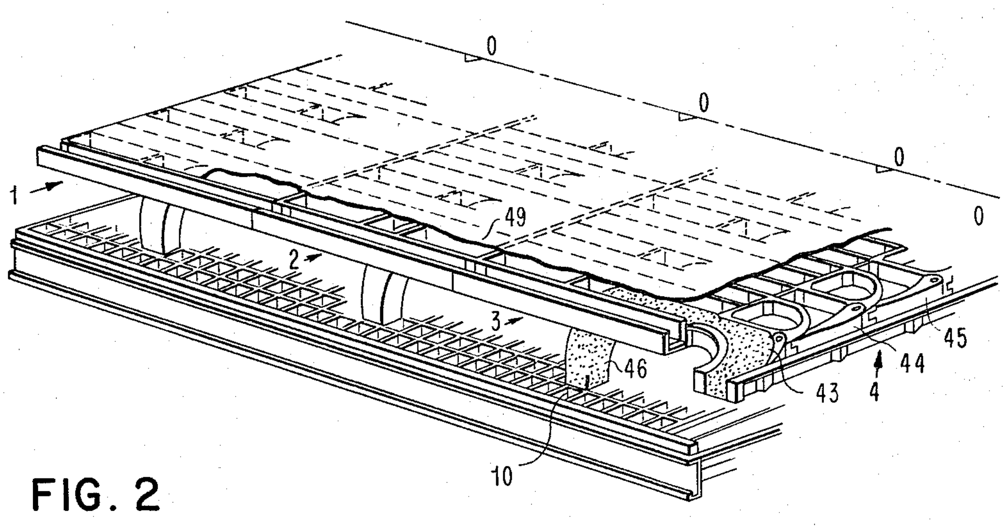
FIG. 2 is an isometric view of the pneumatic carrier accessing system with the three column select sections and the row select at the 0 position and one of the deflector valves of the row select operated to select an elbow of the column select section nearest the row select to provide pneumatic and mechanical communication to the file I/O tube through the row select for the selected elbow.

Refer next to FIG. 2 wherein a description of the selection of a particular delivery channel will be given. As illustrated in FIG. 2, the column select sections 1, 2 and 3 are in the same position as they were in FIG. 1. Additionally, the row select means 4 remains in the same position or 0 position in which it was in FIG. 1. With all of the four members at the 0 or home position, actuation of the deflector blade 43 will cause the pneumatic and mechanical path from the file I/O tube 14 to be set up into the elbow 46 of the column select section 3 such that vacuum or pressure may be applied to the delivery channel which is in alignment with the elbow. Thus, a cell may delivered to this pocket or may be received from this pocket.

Figure 3:
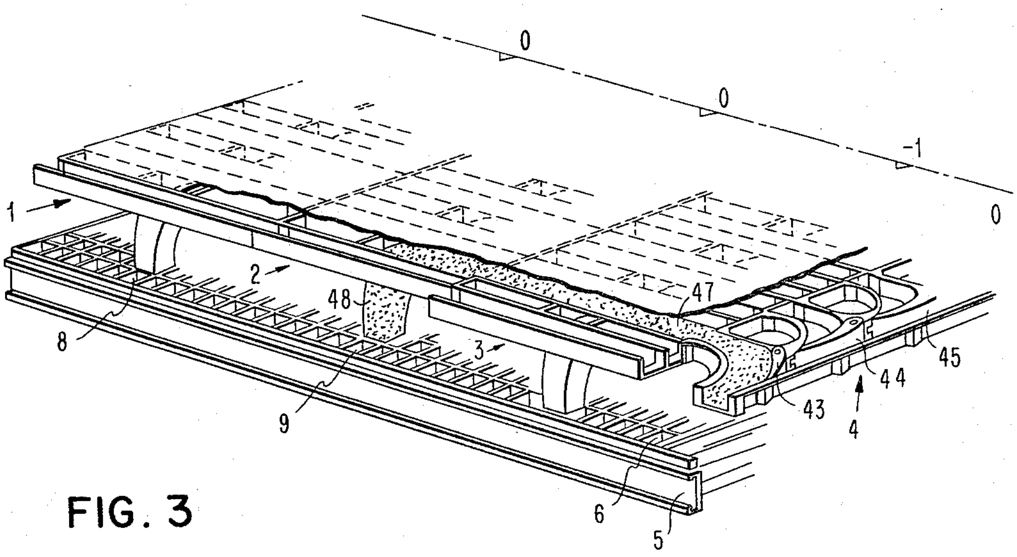
FIG. 3 is an isometric view of the system with the column select system nearest the row select moved to a —1 position while the other two sections and the row select mechanism are at the 0 position to select an elbow of the middle column select segment for communication with the file I/O through the row select.

Refer next to FIG. 3 wherein the column select section 3 has been shown displaced to the −1 position while the column select sections 1 and 2 and the row select means 4 remain positioned at the 0 or home position. With the positioning of the column select section 3 as shown in FIG. 3, the through channel 47 is in alignment with the opening provided by the deflector blade 43 such that the elbow 48 of the column select section 2 is in mechanical and pneumatic communication with the file I/O tube 14 through the row select means 4. Again, as is obvious from a consideration of FIG. 3, the deflector valve or blade 43 of the row select means is in the position that it was in FIG. 2.

Figure 4:
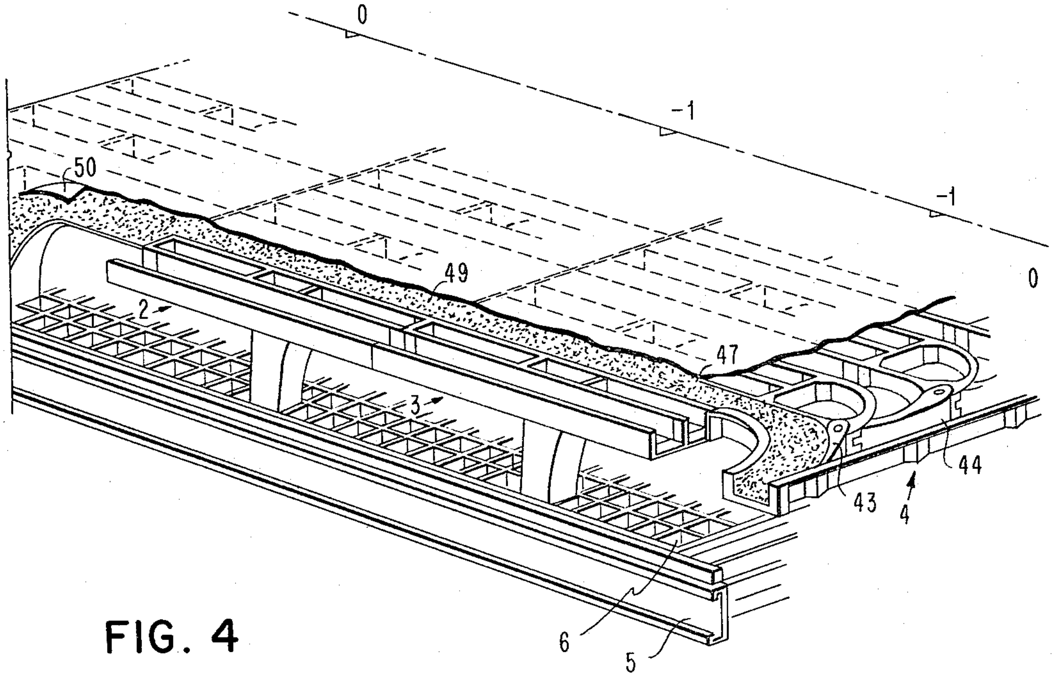
FIG. 4 is an isometric view of the system in which two column select sections are displaced to the —1 position to provide pneumatic and mechanical communication for the elbow of the column select section farthest from the row select through them and the row select to the file I/O tube.

Refer next to FIG. 4 wherein the column select section 1 is shown at the 0 or home position with the column select sections 2 and 3 in the −1 position and the row select means at the 0 or home position. Again, as in FIGS. 2 and 3, the deflector blade 43 is actuated to provide a mechanical and pneumatic path to the through channel 47 of the column select section 3. Since the column select section 2 has been moved to the −1 position, the through channel 49 thereof is in alignment with the through channel 47 of the channel select section 3 to provide mechanical and pneumatic communication with the elbow 50 of the column select section 1.

Thus, accessing of the 0 or center delivery channel of the delivery columns 8, 9 and 10 serviced by elbows 50, 48 and 46 has been described.

The accessing of the other two delivery channels serviced by each of the elbows 46, 48 and 50 is likewise effected through selective movement of the sections 1, 2 and 3 and the row select means 4. In the following description, assume that the delivery channel nearest the file I/O tube is the −1 delivery channel while the delivery channel on the other side of the 0 position is the +1 delivery channel. The complete servicing of the +1 and −1 delivery channels associated with each of the elbows will next be described. To complete servicing of the +1 and −1 delivery channels by elbows 46, 48 and 50, the deflector valve 43 remains operated as in FIGS. 2, 3 and 4. To service the −1 delivery channel by elbow 46, the column select section 3 is moved to the −1 position and the row select is moved to the −1 position. Thus, the −1 delivery channel is serviced by elbow 46. The −1 delivery channel of the column of delivery channels 9 is accessed by elbow 48 when the row select 4 is in the −1 position, the column select section 3 in the 0 position and the column select section 2 in the −1 position. The −1 delivery channel of column of delivery channels 8 serviced by elbow 50 is accomplished by positioning the row selector in the −1 position, the column select section 3 in the 0 position, the column select section 2 in the 0 position, and the column select section 1 in the −1 position. Accessing of the +1 delivery channel of the column of delivery channels 10 is accessed by positioning the row select in the +1 position and the column select section 3 in the +1 position. Accessing of the +1 delivery channel in the column of delivery channels 9 of elbow 48 is accomplished by positioning the row select in the +1 position, the column select section 3 in the 0 position and column select section 2 in the +1 position. Accessing of the +1 delivery channel of the column of delivery channels 8 is accomplished by positioning the row select in the +1 position, the column select section 3 in the 0 position, the column select section 2 in the 0 position, and the column select section 1 in the +1 position.

Thus, the accessing selectively by elbows 46, 48 and 50 of their three associated delivery channels 0, +1 and −1 in each of the columns of delivery channels 8, 9 and 10 has been described. In a similar manner, with selective operation of the other deflector valves in the row selector means along with associated positioning of the column select sections 1, 2 and 3 and the row selector 4 complete coverage of all 15 delivery channels in each of the columns of delivery channels 7, 8 and 9 can be accomplished.

For purposes of compactness and to facilitate the description, the drawings in FIGS. 1–4 have been made partially cutaway and additionally, only three complete column select segments are shown in the column select sections 2 and 3. The column select section 1 is however complete, providing 5 segments. Likewise, the row select means has only three deflector blades 43, 44 and 45 as shown in FIGS. 1–4; however, there will be one effective deflector blade associated with each of the column select segments of the column select sections.

Refer next to FIG. 5 wherein a more detailed view of the row select means is shown. In FIG. 5, there are shown four deflector blades 43, 44, 45 and 51 which are selectively operable to open an associated passage of the column select section 3 to the file I/O tube 14 through the row select means. Thus, if column select section 3 remains stationary, deflector 43 when actuated, will provide pneumatic and mechanical communication with the passages 47, 52 and 53 depending on the position of the row select means. When the row select means is positioned at the +1 position as is the case in FIG. 5, the mechanical and pneumatic path will be set up between the file I/O tube 14 and the through passage 47 while the row select means is in the 0 or home position, the passage 52 which is connected to the elbow 46 will be in mechanical and pneumatic communication with the file I/O tube. Likewise, when the row select means is at the −1 position, the through passage 53 will be in mechanical and pneumatic communication with the file I/O tube. The same is true with respect to deflector blades 44, 45 and 51 wherein each one of them may service the three passages of its associated segment of the column select section 3. In this manner, all 15 of the column select passages in the column select section 3 may be serviced through selected actuation of the deflector blades 43, 44, 45 and 51 and selective movement of the row select means 4.

Again, referring to FIG. 5, it will be seen that to prevent pneumatic loss when vacuum or pressure is applied to the file I/O tube, that the non-selected passages 52, 53, 54 and 55 which are in alignment with the row select means are pneumatically sealed not only by means of the respective deflector valves being closed but additionally, are sealed by pneumatic sliders 56–59 which are mechanically linked to the deflectors 43–45 and 51, respectively, such that when the passages from the row select are not the selected ones, the sliders 56–60 are moved into place to provide complete pneumatic sealing of the row select means from the column select means other than through the selected passage. Slider 56 in the position of FIG. 5 is withdrawn to provide a complete path from the passage 47 through the row select means 4.

Refer next to FIG. 6 wherein is shown a bottom view of the row select means of FIG. 5 which is included to facilitate an understanding of the control thereof. In FIG. 6 is shown actuators 62–66 which are coupled through grasshopper springs 67–71 to the deflectors 43–45, 51 and 61. Actuation of the actuators 62–66 is accomplished by applying an appropriate potential along lines 88–92. The actuator blade 61 is a fixed deflector as shown in FIG. 5 and the actuator 66 which is associated therewith only causes the pneumatic slider 60 to operate upon actuation of the actuator by application of a potential along line 92. All of the actuators function the same. Consequently, a detailed description will only be given with respect to actuator 62 and its associated linkages.

Actuation of actuator 62 through application of a potential along line 88 causes the linkage 72 and deflector 43 to pivot about pivot point 73 to cause linkage 74 which is connected to one end thereof to pull, through pin 76, the arm 77 to cause it to actuate about pivot point 75. Therefore, the slider 56 which is connected to arm 77 will open. Additionally, actuation of actuator 62 causes deflector 43 to be rotated open about pivot point 73 such that the passage or column which is in alignment with the path presented by deflector 43 to be pneumatically and mechanically opened to the row select means 4. Again, deenergization of actuator 62 will allow grasshopper spring 67 to close deflector 43 and again seat the slider 56 to again close the pneumatic path. Provided in operable association with each of the arms which drive the pneumatic sliders is a micro-switch 78–82 from which a signal indicative of whether or not the slider is open or closed may be obtained along lines 83–87, respectively. Thus, control of the deflector valve of the row select means is along lines 88–92 while the sensing conditions of the actuators is taken along lines 83–87.

Refer next to FIG. 7 wherein is shown a detenting member and sensing member for use with the column select sections 1, 2 and 3 and row select means 4. The apparatus of FIG. 7 functions to provide a feedback indication as to whether or not the detent has actually taken place and if so at which position the member is residing. Each of the members is provided with a detent rack which contains three notches 93, 94 and 95, which, when positioned over the detent 96, corresponds to the −1, 0 and +1 positions, respectively. The detent 96 is actuated by a solenoid or air cylinder member 97 and is controlled along detent actuate line 98. The member 97 is held by the frame member 99 and the detent member 96 is connnected to or may be integral with the sense piston 100 extending from the opposite end of the detent mechanism or actuator 97. Carried by the sense piston 100 is a ferrous flag 101 which is movable between two reed switches 102 and 103 and their associated magnets 104 and 105, respectively. When the detent 96 is in one of the notches 93, 94 or 95, the ferrous flag 101 is withdrawn such that the reed switches 102 and 103 are in magnetic association with their respective magnets. Also, connected to the rack 105 by means of a connector bar 106 is a ferrous position flag 107 which is moved between one of the reed switches 102 or 103 and its associated magnet when the rack is moved from the home position. Thus, information may be taken along lines 108 and 109 as to whether or not the detent is engaged and additionally, if it is engaged, at which position it is engaged.

FIG. 8 is a truth table of the conditions of the reed switches 102 and 103. In the truth table of FIG. 8, when a ferrous flag is positioned between a reed switch and its associated magnet, the reed switch is considered to be open or in the 0 position whereas when the reed switches are exposed to their associated magnets, the reed switch is considered to be in the 1 or closed position. Thus, sensing of the lines 108 and 109 will provide an indication as to whether or not detenting has taken place and in which position the rack 105 is located.

While all three column select sections include through tubes on each side of the elbow, it will, of course, be obvious that the through tube sections of column select section 1 are not used. In the claims, each column select section will be described as having a through passage section on each side of the elbow, but it should be understood that technically the section farthest from the row select 4 need have through tube sections.

In summary, the pneumatic accessing system includes four main units: three identical units, the column select sections 1, 2 and 3 and a row selector 4. Each column select section is made up of 5 column select segments, each including a 90° elbow with a straight or through tube on each side. These 5 segments are ganged for movement. The row selector includes a prime outlet 7 at one end thereof connected to the file I/O tube 14 and 5 outlets, each controlled by a deflector valve 43–45 and 51, which depending on the position of their associated deflector valves, may be connected to the prime outlet 7. The deflector valves are individually controlled. Each of the four units 1, 2, 3 and 4 has three fixed locations, a center position or 0 position and a +1 position and a −1 position. When all of the units are at the 0 position, all of the elbows are in line and the five deflector controlled outlets in the row selector are lined up with the five elbows in the adjacent column select section. The spacing between the straight tubes and elbows is such that at whatever positions the different units are, the straight tubes and/or elbows of the three column select segments and the outlets in the row select are in alignment. The straight tubes in the column select sections connect the row select and selected elbows of the column selector sections spaced from the row selector. Each elbow covers three adjacent rows. Thus, complete coverage of three columns of 15 delivery channels may be obtained through selective movement of the four members between the 0, +1 or −1 positions along with selective manipulation of the five deflector valves in the row select mechanism.

While the invention has been particularly shown and described with reference to a preferred embodiment thereof, it will be understood by those skilled in the art that the foregoing and other changes in the form and details may be made therein without departing from the spirit and scope of the invention.

What is claimed is:

1. In a storage system wherein carriers are stored in a file including at least one column of delivery channels, means for establishing a mechanical path between one of said delivery channels and a file I/O tube, said means comprising:
   - a column select means including at least one elbow selectively movable into mechanical association with each of said delivery channels; and
   - row select means operable to mechanically connect the said elbow which is in mechanical association with a selected delivery channel to said file I/O tube.

2. In the storage system of claim 1, the means for establishing a mechanical path further including a plurality of elbows in said column select means and means for positioning each of said elbows of said column select means along its associated column of delivery channels into mechanical association with three adjacent delivery channels into a home, +1 or −1 position.

3. In the storage system of claim 1, said column select means further including a plurality of elbows and a pair of through passage sections flanking each of said elbows to form a segment which is movable to form a passage to said row select means from a selected elbow in mechanical association with a selected delivery channel.

4. In the storage system of claim 3, said column select means further includes one segment for each delivery channel, which segments are ganged for movement to form a passage to said row select means from a selected elbow in mechanical association with a selected delivery channel.

5. In the storage system of claim 4, said row select means being movable into alignment with the passage from a selected delivery channel to connect the file I/O tube therewith.

6. In the storage system of claim 5, said row select means being operable to mechanically connect said file I/O tube with the passage from a selected delivery channel and to mechanically block the remaining passages entering said row select means.

7. In the storage system of claim 5, means for moving said row select means into a home, +1 or −1 position.

8. In the storage system of claim 7, said row select means including a deflector valve associated with each segment such that operation thereof will connect either the elbow or one of the through passage sections to said file I/O tube through said row select means.

9. In the storage system of claim 8, said column select means further including first and second segments, said first section being in operable association with said row select means and said second section being separated from said row select means but selectively in communication therewith through said first section.

10. In the storage system of claim 9, said column select means further including means for positioning said first and second sections such that the elbow of said second section is in selective communication through the through passages of said first section to said file I/O tube through said row select means.

References Cited by the Examiner

UNITED STATES PATENTS

| | | | |
|---|---|---|---|
| 887,608 | 5/1908 | Duflon. | |
| 1,776,697 | 9/1930 | McGuinness et al. | 243—27 X |
| 3,174,645 | 3/1965 | Wilmer | 221—88 X |

OTHER REFERENCES

IBM Technical Disclosure Bulletin, vol. 6, No. 6, page 42, November 1963, 1 page.

SAMUEL F. COLEMAN, *Primary Examiner.*